J. C. & T. Couldry.
Pump Valve.
N° 86,216.   Patented Jan. 26, 1869.
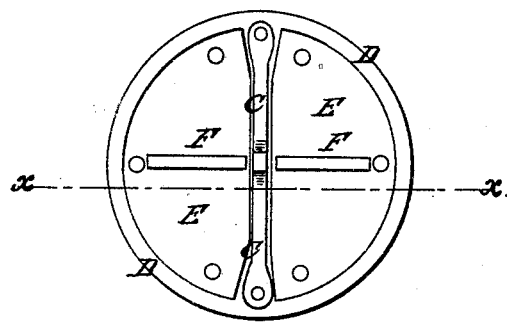
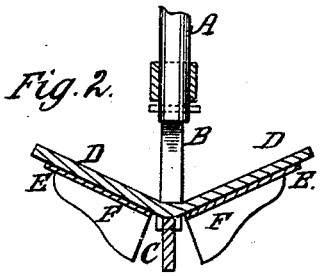
Witnesses,
Wm A. Morgan
G. C. Cotton.
Inventor;
Jos. C. Couldray
Thos Couldray
per Munn &Co
Attorneys

JOSEPH C. COULDREY, OF NEW YORK, N. Y., AND THOMAS COULDREY, OF LIVERPOOL, ENGLAND.

Letters Patent No. 86,216, dated January 26, 1869.

IMPROVEMENT IN PUMP-VALVES.

The Schedule referred to in these Letters Patent and making part of the same.

*To all whom it may concern:*

Be it known that we, JOSEPH C. COULDREY, of the city, county, and State of New York, and THOMAS COULDREY, of Liverpool, England, have invented a new and useful Improvement in Pump-Valves; and we do hereby declare that the following is a full, clear, and exact description thereof, which will enable others skilled in the art to make and use the same, reference being had to the accompanying drawings, forming a part of this specification.

Figure 1 is an under-side view of our improved pump-valve.

Figure 2 is a detail sectional view of the same, taken through the line $x\,x$, fig. 1.

Similar letters of reference indicate corresponding parts.

Our invention has for its object to furnish an improved pump-valve, designed especially for ship-pumps, but which shall be equally adapted for use in other situations, and which shall be so constructed and arranged as to avoid the liability to become choked or clogged by substances that may find their way into the wells; and It consists in the valve constructed as hereinafter more fully described.

A is the pump-rod, to the lower end of which is attached a semicircular cross-bar, B, having a horizontal cross-bar, C, attached to its lower ends.

D is the valve, consisting of a leather, rubber, or other flexible disk, which is clamped between the cross-bar C, upon which it rests, and the ends of the curved cross-bar B.

The sides or flaps of the valve D are stiffened by semicircular plates E, of a smaller diameter than the said disks D, attached to their lower or upper sides, or to both.

In the form represented in figs. 1 and 2, the plates E are attached to the under sides of the flaps or wings of the disk, and have flanges or arms F formed upon or attached to them, the inner ends or shoulders of which flanges or arms rest against the sides of the cross-bar C, so as to support the said flaps while raising the water.

When the pump-barrel is rough, it may be desirable to make the disk D of a larger diameter than the diameter of the said pump barrel, so as to be cupped to compensate for the wear.

With valves constructed in this manner, no rings or bands are required, which, in pumps constructed in the ordinary manner, obstruct the passage of foreign substances through the pump, and thus cause it to become clogged.

Having thus described our invention,

What we claim as new, and desire to secure by Letters Patent, is—

The combination of the curved cross-bar B, straight cross-bar C, leather or rubber disk D, semicircular plates E, and flanges or arms F, formed upon the plates E, with each other and with the pump-rod A, substantially as herein shown and described, and for the purpose set forth.

The above specification of our invention signed by us, the 28th day of April, 1868, and 13th day of May, 1868.

JOSEPH C. COULDREY.
THO. COULDREY.

Witnesses for JOSEPH C. COULDREY:
 WM. F. MCNAMARA,
 JAMES T. GRAHAM.

Witnesses for THOMAS COULDREY:
 JOHN WOHLERS,
 THOMAS TAYLOR.